United States Patent
Bobo et al.

(10) Patent No.: US 10,006,575 B2
(45) Date of Patent: Jun. 26, 2018

(54) MODULAR PUSH-TO-CONNECT ASSEMBLY

(71) Applicant: NIBCO Inc., Elkhart, IN (US)

(72) Inventors: David A. Bobo, Granger, IN (US); Keith W. Yoder, Syracuse, NY (US); James A. LaFortune, Elkhart, IN (US)

(73) Assignee: NIBCO Inc., Elkhart, IN (US)

( * ) Notice: Subject to any disclaimer, the term of this patent is extended or adjusted under 35 U.S.C. 154(b) by 0 days. days.

(21) Appl. No.: 15/166,477

(22) Filed: May 27, 2016

(65) Prior Publication Data

US 2016/0273695 A1    Sep. 22, 2016

Related U.S. Application Data (63) Continuation-in-part of application No. 14/564,293, filed on Dec. 9, 2014, now Pat. No. 9,447,906, and a continuation-in-part of application No. 14/564,271, filed on Dec. 9, 2014, now Pat. No. 9,541,228.

(60) Provisional application No. 61/914,533, filed on Dec. 11, 2013, provisional application No. 61/914,522, filed on Dec. 11, 2013.

(51) Int. Cl.
    *F16L 37/091* (2006.01)
(52) U.S. Cl.
    CPC .................. *F16L 37/0915* (2016.05)
(58) Field of Classification Search
    CPC ..................................... F16L 37/091
    USPC ........................................ 285/340
    See application file for complete search history.

(56) References Cited

U.S. PATENT DOCUMENTS

| | | | |
|---|---|---|---|
| 2,005,056 A | 6/1935 | Stephens |
| 2,201,372 A | 5/1940 | Miller |
| 2,459,251 A | 1/1949 | Stillwagon |
| 2,475,741 A | 7/1949 | Goeller |
| 2,484,192 A | 10/1949 | Squiller |
| 2,491,004 A | 12/1949 | Graham |
| 2,831,711 A | 4/1958 | Leadbetter |

(Continued)

FOREIGN PATENT DOCUMENTS

| | | |
|---|---|---|
| CN | 2428674 Y | 5/2001 |
| EP | 0528079 | 2/1993 |

(Continued)

OTHER PUBLICATIONS 3 pages of photographs of prior art commercial fittings Jul. 14, 2008.

(Continued)

*Primary Examiner* — David E Bochna
(74) *Attorney, Agent, or Firm* — Price Heneveld LLP (57) ABSTRACT

A push-to-connect modular cartridge for a plumbing fitting includes a cylindrical cup having an annular surface at one end and a cylindrical shoulder at an opposite end. A circular seal is positioned against the annular surface, and a circular backing ring is positioned against the seal on a side opposite the annular surface. A grab ring including inwardly projecting tines is seated against the backing ring on a side opposite the seal, and a containment ring contacts the grab ring on a side opposite the backing ring. The containment ring is engaged by the shoulder of the cup to hold the containment ring, grab ring, backing ring, and seal together. This modular push-to-connect cartridge can be welded to a plumbing fitting which uses significantly less material, thereby greatly reducing the cost to manufacture.

12 Claims, 9 Drawing Sheets

(56) References Cited

U.S. PATENT DOCUMENTS

| | | |
|---|---|---|
| 2,950,132 A | 8/1960 | Kocsuta |
| 3,116,078 A | 12/1963 | Scherer |
| 3,204,988 A | 9/1965 | Ouderkirk et al. |
| 3,312,483 A | 4/1967 | Leadbetter et al. |
| 3,380,765 A | 4/1968 | Himmel |
| 3,409,314 A | 11/1968 | Roe |
| 3,453,006 A | 7/1969 | Levake |
| 3,477,750 A | 11/1969 | Powell |
| 3,603,619 A | 9/1971 | Bengesser et al. |
| 3,837,687 A | 9/1974 | Leonard |
| 3,874,709 A | 4/1975 | MacDonald |
| 3,884,508 A | 5/1975 | Jones |
| 3,909,046 A | 9/1975 | Legris |
| 3,915,480 A | 10/1975 | Kish et al. |
| 3,920,270 A | 11/1975 | Babb, Jr. |
| 3,924,877 A | 12/1975 | Leopold, Jr. et al. |
| 4,043,576 A | 8/1977 | Reich et al. |
| 4,073,514 A | 2/1978 | Pate |
| 4,084,843 A | 4/1978 | Gassert |
| 4,123,090 A | 10/1978 | Kotsakis et al. |
| 4,138,146 A | 2/1979 | Rumble |
| 4,163,573 A | 8/1979 | Yano |
| 4,564,221 A | 1/1986 | Ishii |
| 4,586,734 A | 5/1986 | Grenier |
| 4,593,943 A * | 6/1986 | Hama .............. F16L 37/0915 285/340 |
| 4,613,172 A | 9/1986 | Schattmaier |
| 4,637,636 A | 1/1987 | Guest |
| 4,664,427 A | 5/1987 | Johnston |
| 4,747,626 A | 5/1988 | Hama et al. |
| 4,919,457 A | 4/1990 | Moretti |
| 4,993,755 A | 2/1991 | Johnston |
| 5,029,908 A | 7/1991 | Belisaire |
| 5,039,141 A | 8/1991 | Badoureaux |
| 5,096,235 A | 3/1992 | Oetiker |
| 5,108,134 A | 4/1992 | Irwin |
| 5,160,179 A | 11/1992 | Takagi |
| 5,301,408 A | 4/1994 | Berman et al. |
| 5,328,215 A | 7/1994 | Grenier |
| 5,370,423 A | 12/1994 | Guest |
| 5,443,289 A | 8/1995 | Guest |
| 5,466,019 A | 11/1995 | Komolrochanaporn |
| 5,490,694 A | 2/1996 | Shumway |
| 5,496,073 A | 3/1996 | Grenier |
| 5,511,830 A | 4/1996 | Olson et al. |
| 5,553,901 A | 9/1996 | Serot |
| 5,573,945 A | 11/1996 | Olson |
| 5,603,530 A | 2/1997 | Guest |
| 5,769,462 A | 6/1998 | Angell |
| 5,813,705 A | 9/1998 | Dole |
| 5,885,450 A | 3/1999 | Reid |
| 5,911,443 A | 6/1999 | Le Quere |
| 5,911,446 A | 6/1999 | McLennan et al. |
| 5,934,712 A | 8/1999 | Friedrich et al. |
| 6,039,361 A | 3/2000 | Meli |
| 6,056,326 A | 5/2000 | Guest |
| 6,065,779 A | 5/2000 | Moner et al. |
| 6,174,002 B1 | 1/2001 | Rho |
| 6,231,090 B1 | 5/2001 | Fukao et al. |
| 6,447,019 B1 | 9/2002 | Hosono et al. |
| 6,464,266 B1 | 10/2002 | O'Neill et al. |
| 6,488,318 B1 | 12/2002 | Shim |
| 6,517,124 B1 | 2/2003 | Le Quere |
| 6,641,178 B2 | 11/2003 | Gowing |
| 6,663,145 B1 * | 12/2003 | Lyall, III .............. F16L 37/091 285/340 |
| 6,685,230 B1 | 2/2004 | Bottura |
| 6,805,385 B2 | 10/2004 | Viegener |
| 6,880,865 B2 | 4/2005 | Guest |
| RE38,786 E | 8/2005 | Guest |
| 6,929,289 B1 | 8/2005 | Guest |
| 6,957,833 B2 | 10/2005 | Guest |
| 7,032,932 B2 | 4/2006 | Guest |
| 7,063,359 B2 | 6/2006 | Vallee |
| 7,100,948 B2 | 9/2006 | Guest |
| 7,121,593 B2 | 10/2006 | Snyder, Sr. et al. |
| 7,316,429 B2 | 1/2008 | Viegener |
| 7,341,286 B2 | 3/2008 | Andre |
| 7,354,079 B2 | 4/2008 | Rehder et al. |
| 7,410,193 B2 | 8/2008 | Guest |
| 7,425,022 B2 | 9/2008 | Guest |
| 7,434,846 B2 * | 10/2008 | Baumgartner ........ F16L 37/091 285/340 |
| 7,448,654 B2 | 11/2008 | Le Quere |
| 7,455,330 B2 * | 11/2008 | Baumgartner ........ F16L 37/091 285/340 |
| 7,497,483 B2 | 3/2009 | Williams et al. |
| 7,533,907 B2 | 5/2009 | Swift et al. |
| 7,621,569 B2 | 11/2009 | Anthoine |
| 7,862,089 B2 | 1/2011 | Crompton |
| 8,205,915 B1 | 6/2012 | Crompton et al. |
| 8,210,576 B2 | 7/2012 | Crompton |
| 8,303,001 B2 * | 11/2012 | Oh .................. F16L 25/0045 285/340 |
| 8,398,122 B2 | 3/2013 | Crompton et al. |
| 8,480,134 B2 | 7/2013 | Crompton et al. |
| 8,585,100 B2 | 11/2013 | Stuits et al. |
| 8,608,205 B2 | 12/2013 | Lai |
| 2002/0109353 A1 | 8/2002 | Guest |
| 2003/0057701 A1 * | 3/2003 | Koo .................... F16L 37/0915 285/340 |
| 2004/0070198 A1 * | 4/2004 | Rohrig ................ F16L 37/0915 285/340 |
| 2007/0075542 A1 | 4/2007 | Glaze et al. |
| 2009/0278346 A1 | 11/2009 | O'Brien |
| 2010/0171302 A1 * | 7/2010 | Yoder ................... F16L 37/098 285/81 |
| 2010/0253064 A1 * | 10/2010 | Le Quere ............. F16B 43/006 285/3 |
| 2011/0088790 A1 | 4/2011 | Schutte et al. |
| 2011/0089684 A1 | 4/2011 | Schutte et al. |
| 2015/0159792 A1 | 6/2015 | Bobo et al. |
| 2015/0159794 A1 | 6/2015 | Bobo et al. |
| 2015/0240980 A1 | 8/2015 | Bobo et al. |

FOREIGN PATENT DOCUMENTS

| | | |
|---|---|---|
| FR | 2394736 | 1/1979 |
| FR | 2689205 | 10/1993 |
| GB | 1520742 | 8/1978 |
| GB | 2167147 | 5/1988 |
| RU | 112736 U1 | 1/2012 |

OTHER PUBLICATIONS

PCT Search Report and Written Opinion for PCT/US2016/034577 dated Feb. 9, 2017.

* cited by examiner

MODULAR PUSH-TO-CONNECT ASSEMBLY

CROSS-REFERENCE TO RELATED APPLICATIONS

This application is a continuation-in-part of U.S. patent application Ser. No. 14/564,293 entitled SELF-LOCKING PUSH-TO-CONNECT INSERT, filed on Dec. 9, 2014, by David A. Bobo, et al., now U.S. Pat. No. 9,447,906 issued Sep. 20, 2016, which claimed priority under 35 U.S.C. § 119(e) and the benefit of U.S. Provisional Application No. 61/914,533 entitled SELF-LOCKING PUSH-TO-CONNECT ASSEMBLY, filed on Dec. 11, 2013, by David Bobo, et al. This application is also a continuation-in-part of U.S. patent application Ser. No. 14/564,271 entitled PUSH-TO-CONNECT FITTING, filed on Dec. 9, 2014, by David A. Bobo, et al., now U.S. Pat. No. 9,541,228 issued Jan. 10, 2017, which claimed priority under 35 U.S.C. § 119(e) and the benefit of U.S. Provisional Application No. 61/914,522 entitled PUSH-TO-CONNECT FITTING, filed on Dec. 11, 2013, by David Bobo et al., the entire disclosures of which are incorporated herein by reference.

BACKGROUND OF THE INVENTION

The present invention relates to an end module for welding to plumbing fittings, such as couplings, T's, elbows, valves, or the like, to allow the fittings to receive and sealably hold fluid conduits in a push-to-connect structure.

There exists numerous push-to-connect plumbing fittings which eliminate the need for laborious steps, such as soldering, threading, or the like when connecting fluid conduits to fittings. In many installations, PEX tubing and mating fittings employ some form of push-to-connect junctions between the PEX conduits and the fittings. In some cases, fittings may involve transitions between PEX plumbing members and mating copper fittings. Also, copper and copper alloy fittings likewise incorporate a variety of push-to-connect assemblies which allow copper or copper alloy tubing, conduits, or plastic conduits to be installed in conventional copper alloy or low lead copper alloy plumbing fittings, such as valves, T's, elbows, and straight couplings.

Many push-to-connect plumbing fittings integrally include structure, such that the installer can select and use the fitting necessary for a particular plumbing system as needed. Cartridges as described in the above-identified parent applications and below can be inserted into existing solder plumbing fittings to form push-to-connect fittings.

SUMMARY OF THE INVENTION

This invention provides a modular cartridge which can be universally attached to a variety of metal plumbing fittings by welding and preferably by laser welding. For the manufacturer of existing fittings, adapting existing couplings, T's, elbows, valves, and the like with push-to-connect assemblies utilizes a significant amount of material, which can be reduced substantially by the modular system of the present invention.

In one embodiment, a push-to-connect end assembly for a fluid fitting comprises a cylindrical cup having an annular surface at one end and a cylindrical shoulder at an opposite end. A circular seal is positioned against the annular surface, and a circular backing ring is positioned against a seal on a side opposite the annular surface. A grab ring including inwardly projecting tines is seated against the backing ring on a side opposite said seal, and a containment ring contacts the grab ring on a side opposite the backing ring. The containment ring is engaged by the shoulder of the cup to hold the containment ring, grab ring, backing ring, and seal together.

This modular cartridge has a circular edge which can be welded in a butt joint to mating copper-based or other metal fittings, such as couplings, elbows, T's, and valves. Such fittings can be made using significantly less material, thereby greatly reducing the cost to manufacture. Also, the modular cartridge can be made in a variety of standard sizes to universally adapt metal plumbing fittings of all sizes to push-to-connect fittings.

These and other features, objects and advantages of the present invention will become apparent upon reading the following description thereof together with reference to the accompanying drawings.

DETAILED DESCRIPTION OF THE PREFERRED EMBODIMENT

Figure 1:
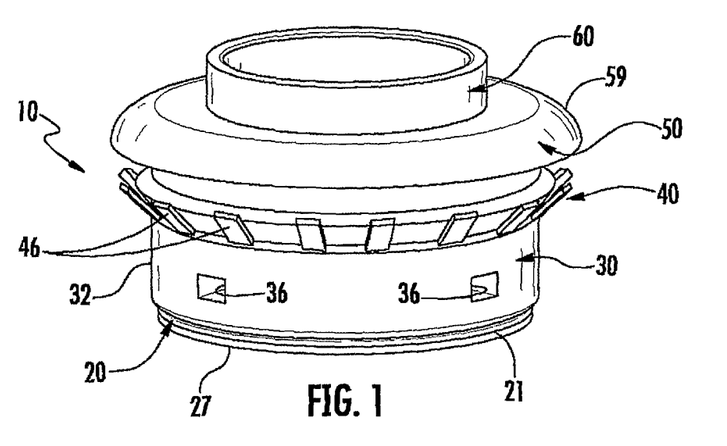
FIG. 1 is a perspective view of a preassembled self-locking push-to-connect insert assembly which can be used in the field to provide push-to-connect plumbing fittings.
Figure 2:
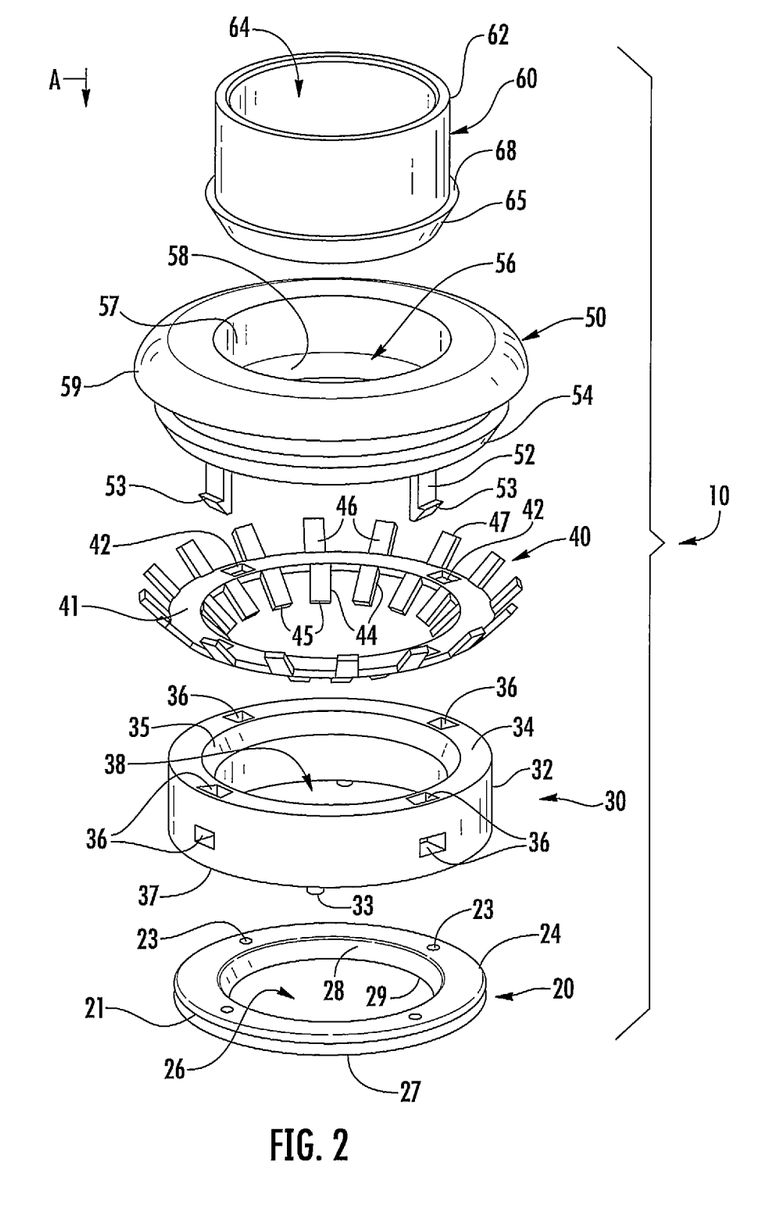
FIG. 2 is an exploded perspective view of the components of the insert assembly shown in FIG. 1.
Figure 3:
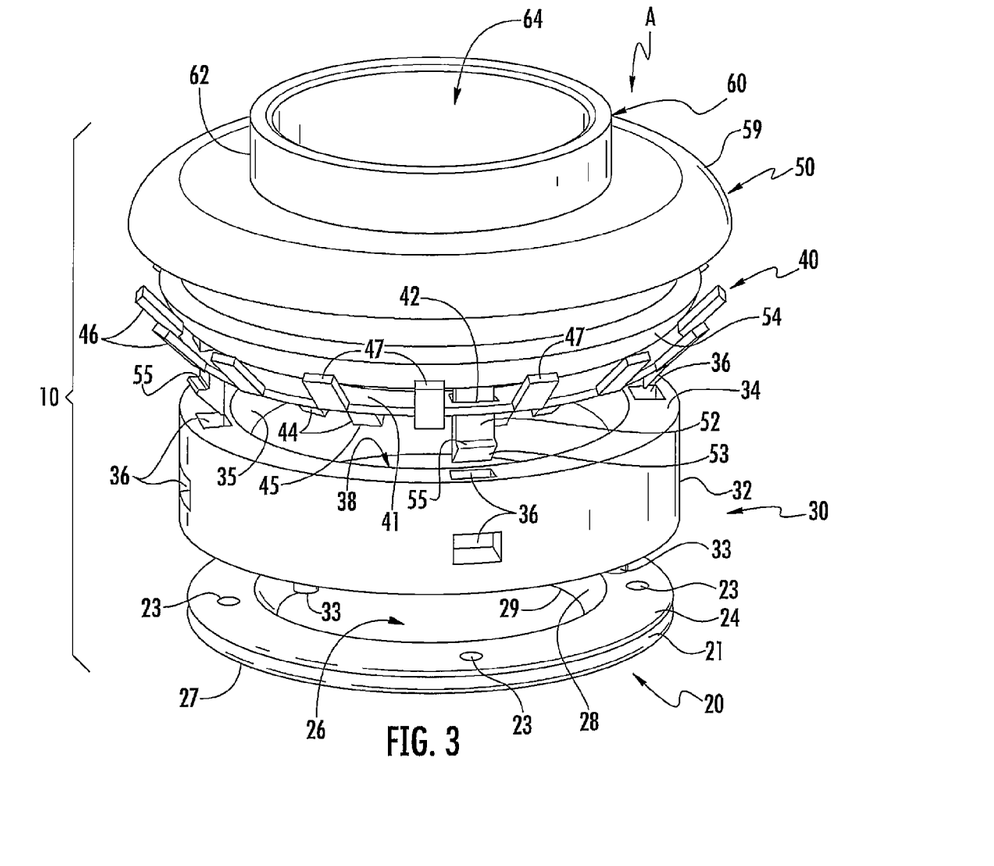
FIG. 3 is an enlarged exploded, partly assembled view of the insert assembly shown in FIGS. 1 and 2.

Referring initially to FIGS. 1-3, there is shown a self-locking push-to-connect insert assembly 10. Assembly 10, as best seen in FIGS. 2 and 3, comprises a dual functioning ring seal 20 positioned below and attached to the lower surface 37 of a first cartridge 30. Above the first cartridge is a dual functioning gripping ring 40. Gripping ring 40 is sandwiched between the first cartridge and a second cartridge 50, which, in the preferred embodiment, receives a release ring 60, as shown in the assembled view of FIG. 1.

Figure 4:
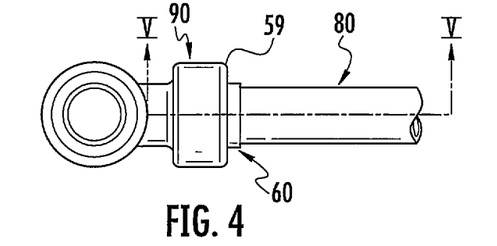
FIG. 4 is a top plan view of a plumbing fitting and conduit coupled thereto using the insert assembly shown in FIGS. 1-3.
Figure 5:
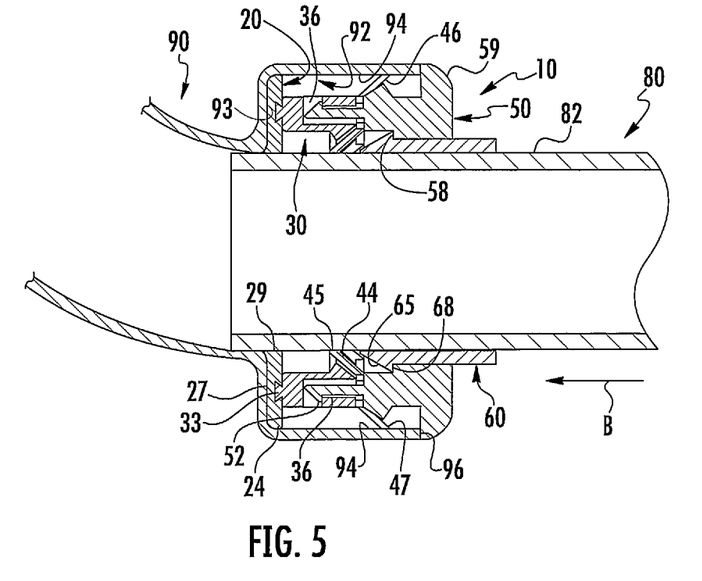
FIG. 5 is an enlarged fragmentary cross-sectional view of the structure shown in FIG. 4, taken along section lines V-V of the of FIG. 4.

The first cartridge 30 comprises a generally cylindrical member having an outer wall 32, a top annular surface 34, and a bottom annular surface 37. A plurality of axially and radially extending apertures 36 spaced at approximately 90° intervals extend partially downwardly through the surface 34 of wall 32 and outwardly through the side. Apertures 36 lockably receive locking tabs 52 of the second cartridge 50, as discussed below. The first cartridge 30 includes a central cylindrical opening 38 with a beveled seat 35 conforming to the angle of the inwardly extending tines 44 of gripping ring 40, as discussed below. The first cartridge 30 further includes downwardly projecting tabs 33, which extend within depressions 23 of an annular or washer-shaped ring seal 20. As best seen in FIG. 3, the annular seal 20 has a generally cylindrical outer edge 24 with an annular indentation 21 providing compressibility for the ring seal 20. The tabs 33 of cartridge 30 engage and index the ring seal 20 with respect to the first cartridge 30 and hold the ring seal in place prior to the insertion of assembly 10 into a plumbing fitting, as illustrated in FIGS. 4 and 5. Ring seal 20 has a circular central opening 26 with a beveled edge 28 defining a flexible edge 29 with a diameter to sealably engage the outer cylindrical wall of a conduit, such as conduit 80 (FIG. 5), when inserted into assembly 10. Seal 20 is made of a suitable elastomeric material typically employed in seals for fluid fittings.

The gripping ring 40 includes a generally washer-shaped body 41, as best seen in FIG. 2, having apertures 42 therein aligned with and dimensioned to receive tabs 52 of the second cartridge and align also with apertures 36 in the first cartridge 30 such that, as illustrated in FIGS. 1 and 5, the gripping ring 40 is sandwiched between the first cartridge 30 and the second cartridge 50 with the tabs 52 extending through the washer-shaped body 41 of the gripping ring 40, as illustrated in FIG. 3. Gripping ring 40 includes inwardly and downwardly extending annularly spaced tines 44 with tips 45 which grip a conduit inserted therein, holding the conduit in place, as illustrated in FIG. 5. Gripping ring 40 also includes upwardly and outwardly extending tines 46 for lockably inserting assembly 10 into the socket end 92 of a plumbing fitting 90, as also illustrated in FIG. 5 discussed below. The tines 44 project inwardly and downwardly at an angle of about 45° and have a length sufficient such that tips 45 dig into the outer wall of a conduit, such as conduit 80, as seen in FIG. 5. The angle of beveled surface 35 of first cartridge 30 is selected to allow the tines 44 to flex somewhat during insertion of a conduit 80, thereby allowing the easy insertion of a conduit within insert assembly 10.

The upwardly and outwardly extending tines 46 of gripping ring 40 extend outwardly at an angle of about 45° and have tips 47 which and are positioned in slightly spaced relationship to a beveled lower annular surface 54 (FIGS. 2 and 3) of second cartridge 50. Thus, the tines 46 can flex inwardly a distance sufficient to enter and lockably engage the inner cylindrical surface 94 of a plumbing fitting 90 when the insert assembly 10 is inserted into the fitting, as shown in FIGS. 4 and 5.

The second cartridge 50 includes downwardly extending locking tabs 52 having arrowhead-shaped heads 53, which extend through apertures 42 in gripping ring 40 (FIG. 3) and through apertures 36 in the first cartridge. The heads of the tabs 52 include a locking surface 55 (FIG. 3) extending outwardly through the radially extending portion of apertures 36. The tabs 52 are dimensioned to snap-lock the first and second cartridges together, as illustrated in FIG. 1, with the gripping ring 40 interlocked and sandwiched therebetween.

The second cartridge 50 includes a central aperture 56 for receiving the conduit 80 and a release ring 60. Within the inner cylindrical side wall 57 of the second cartridge 50 is an annular shoulder 58 (FIGS. 2 and 5) which is engaged by a locking surface 68 (FIG. 2) at the top of a tapered surface 65 of release ring 60, as best seen in FIG. 5. The tapered surface 65 engages tines 44 of the gripping ring 40 when the release ring is pushed downwardly in the direction indicated by arrow A in FIGS. 2 and 3 to deflect tines 44 outwardly, such that the tips 45 disengage the outer wall 82 of conduit 80, allowing the conduit to be removed from the insert assembly 10. The release ring 60 includes a generally cylindrical body 62 with a central aperture 64 for receiving conduit 80. The upper surface of second cartridge 50 has a curved shoulder 59 and a diameter generally conforming to the size of the plumbing fitting into which the assembly 10 is mounted, as best seen in FIGS. 4 and 5.

Assembly 10 is manufactured, as illustrated in FIG. 3, by inserting the release ring 60 into locking engagement with the second cartridge 50. The tabs 52 of the second cartridge are then extended through the apertures 42 of gripping ring 40. Then, the locking tabs 52 of the second cartridge are inserted further downwardly through the axially and radially extending apertures 36 of the first cartridge until the locking tab heads 53 snap radially outwardly through the radial extensions of apertures 36, thereby locking the first and second cartridges together with the gripping ring 40 held therebetween. Finally, the ring seal 20 is pressed onto the tabs 33 of the first cartridge, holding the entire assembly together, as seen in FIG. 1, for subsequent use with any type of plumbing fitting for which insert assembly 10 is dimensioned to fit.

FIGS. 4 and 5 illustrate the use of insert assembly 10 for coupling a conduit 80 to a plumbing fitting 90. Fitting 90 is illustrated as an elbow, although it can be any form of pipe fitting, such as a T, a coupling, a valve, or other plumbing fitting in which a conduit is to be sealably coupled. Fitting 90 includes an enlarged cylindrical end socket 92 having an inner cylindrical side wall 94 into which assembly 10 is mounted prior to insertion of conduit 80. When fully inserted as illustrated in FIG. 5, the lower surface 27 of ring seal 20 is compressed against the annular end wall 93 of socket 92 and the outer edge 24 of ring seal 20 engages inner surface 94 of the socket 92 to seal the connection of insert assembly 10 to fitting 90. The inner edge 29 of section 28 of seal 20 engages the outer cylindrical wall 82 of conduit 80 to seal the connection of conduit 80 to insert assembly 10. When the insert 10 is installed, the ring seal 20 is under compression to provide a seat between the socket 92 and conduit 80.

When the insert 10 is installed, the tips 47 of outwardly extending tines 46 of gripping ring 40 dig into and engage the inner cylindrical surface 94 of socket 92, and shoulder 59 of second cartridge 50 engages the outer annular rim 96 of the socket 92. The tips 45 of inwardly extending tines 44 of gripping ring 40 engage the outer cylindrical wall 82 of the conduit to hold it in place. The release ring 60 including its tapered surface 65 is in the position shown in FIG. 5, allowing the gripping ring 40 to hold the conduit 80 within fitting 90. As can be seen in FIG. 5, if the release ring 60 is moved to the left (in the direction of arrow B), the tapered surface 65 will engage tines 44, urging them away from surface 82 of conduit 80, allowing removal of conduit 80.

Figure 6:
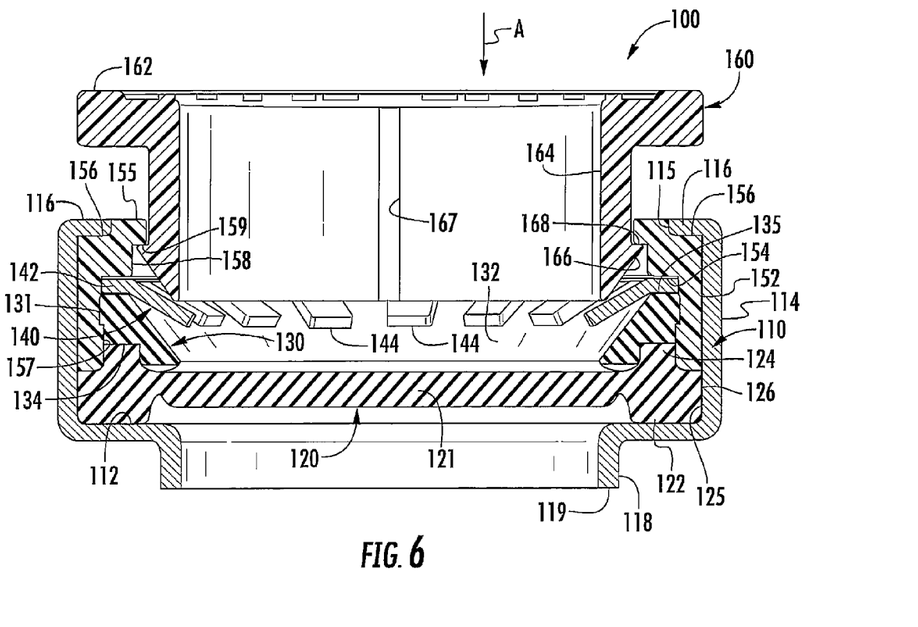
FIG. 6 is a cross-sectional view of a modular cartridge assembly of the present invention.
Figure 7:
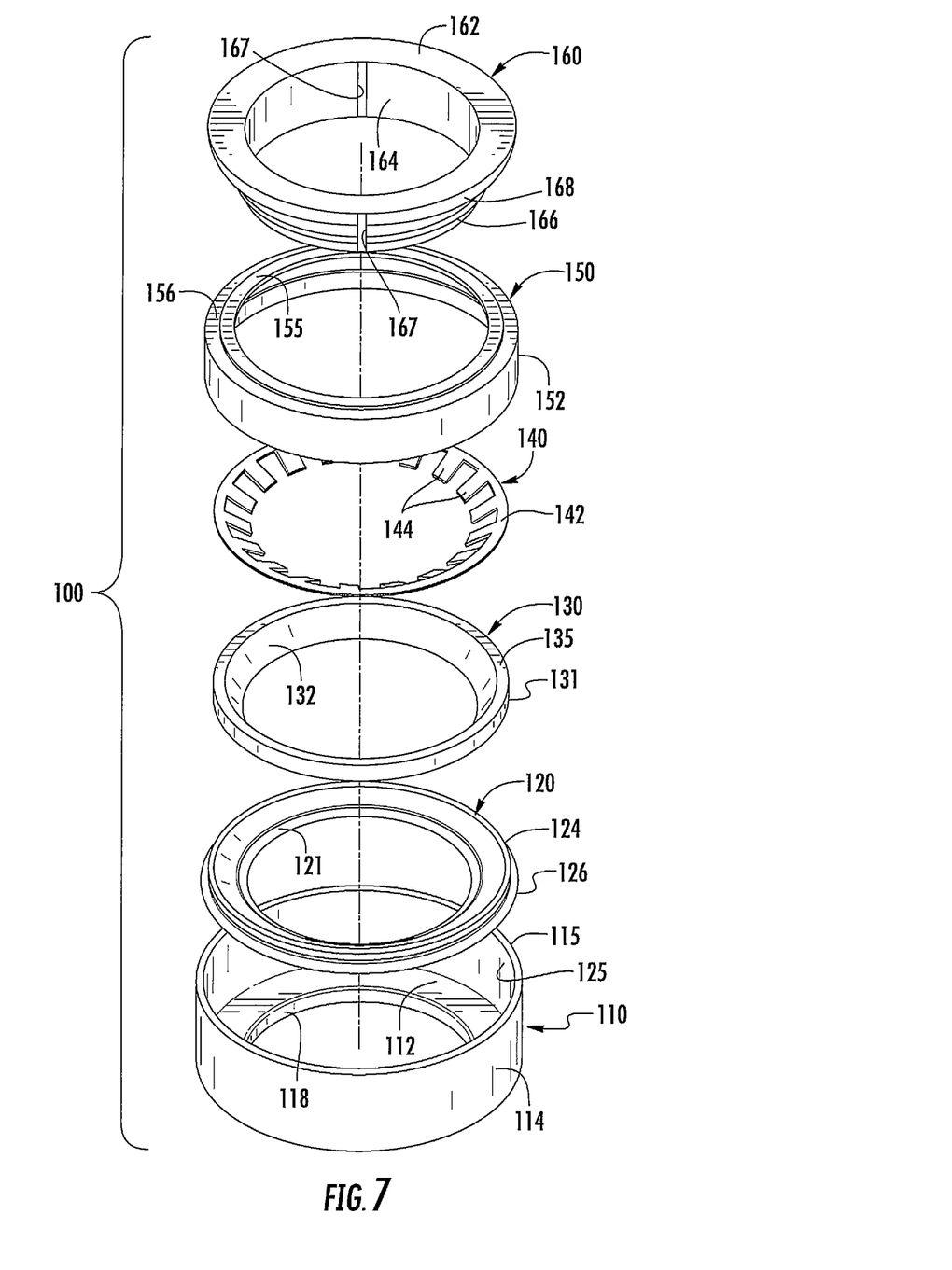
FIG. 7 is an exploded perspective view of the components of the assembly shown in FIG. 6.

Referring now to FIGS. 6 and 7, a modular cartridge 100 is shown which embodies the present invention. Modular cartridge 100 includes a generally cylindrical cup 110 having an inner annular surface 112, a cylindrical side wall 114, and a shoulder 116 formed by roll-forming the upper edge 115 over the annular shoulder 156 of a containment ring 150. As seen in FIGS. 6 and 7, the cup also includes an outwardly extending cylindrical extension 118 which, as described below, has a circular edge 119 which can be welded to mating plumbing fittings, such as one of a coupling, elbow, T, or valve. The cup 110 is made of a metallic material and preferably made of a copper alloy, as is the plumbing fitting to which modular cartridge 100 is attached. The following materials are examples of those which can be employed for the cup 110 and mating fittings:

Wrought Copper Alloys:
  Coppers: C10200
    C11000
    C12200
  Brasses: C27450
    C27451
    C46400
    C46500
  Bronzes: C69300
    C69400
    C69430
Cast Copper Alloys:
  Brasses C87500
    C87600
    C87850

A European alloy identified by the British standard BS EN 12165, which is CW511L, can also be employed.

Also, the American Iron and Steel Institute (AISI) types can be employed:

Austenitic Stainless Steels: 304
    304L
    316
    316L A circular generally washer-shaped seal 120 is fitted within the cup 110 and includes an outer lower annular surface 122 (FIG. 6) which engages the annular surface 112 of cup 110. The seal 120 also includes an upwardly extending annular rim 124 having a diameter slightly less than the annular surface 122 and an outer cylindrical rim 126 which engages the inner wall 125 of the cylindrical side wall 114 of cup 110. Seated against the seal 120 is a backing ring 130 which has a conically tapered inner wall 132 and a step-cut recess 134 (FIG. 6) which receives rim 124 of seal 120. Seal 120 includes an inner cylindrical surface 121 which sealably engages the outer wall of a conduit, such as walls 191 and 196 of conduits 190 and 195 shown in FIG. 9. Thus, when installed as seen in FIG. 6, seal 120 seals the components within cup 110 and seals a conduit held by modular cartridge 100.

Figure 9:
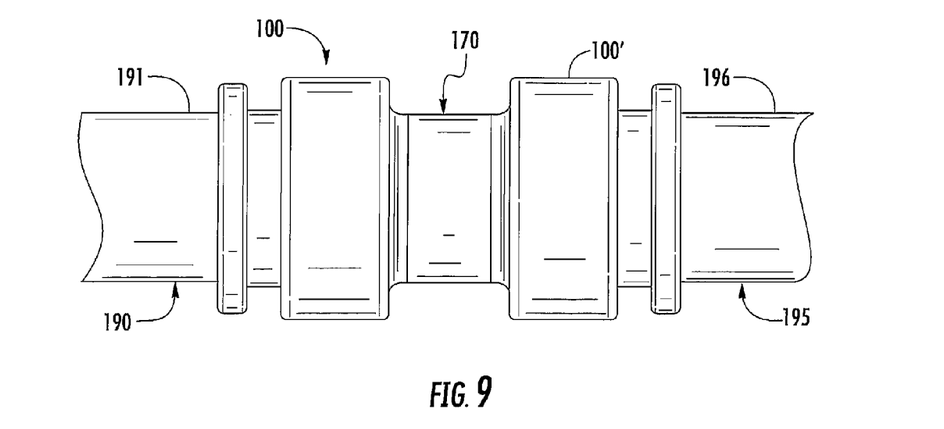
FIG. 9 shows the coupling of FIG. 8 with fluid conduits coupled together using the coupling shown in FIG. 8.

Stacked above the backing ring 130 is a grab ring 140, which is generally circular, having an outer rim 142 and a plurality of spaced-apart downwardly inclined, inwardly projecting tines 144 for gripping a conduit positioned in the plumbing fitting, including the modular cartridge 100, as illustrated in FIG. 9. Grab ring 140 is made of a spring steel and frequently made of stainless steel. The lower surface of rim 142 of grab ring 140 rests upon upper annular surface 135 of backing ring 130. A containment ring 150 sandwiches the grab ring 140 and backing ring 130 together and includes a cylindrical side wall 152 which engages the inner cylindrical wall 125 of cup 110. Ring 150 includes a stepped upper rim including a surface 154, which overlies and engages the rim 142 of grab ring 140, as best seen in FIG. 6. The containment ring 150 also includes an annular shoulder 156, which is clamped in position by shoulder 116 of the cup 110 when roll-formed over the containment ring, as seen in FIG. 6. The containment ring 150 also includes an inwardly projecting flange 155 defined by a reduced diameter cylindrical wall 158. Flange 155 has a lower annular surface 159 which lockably receives and holds a release ring 160. Ring 150 includes an inwardly extending annular lower end 157 with a ridge which snap-fits under an annular projecting edge 131 of backing ring 130, as best seen in FIG. 6.

A release ring 160 is employed to selectively deflect the tines 144 of grab ring 140 outwardly for releasing a conduit from the modular cartridge 100. Release ring 160 includes an annular flange 162, which projects above the containment ring 150, as seen in FIG. 6, and a downwardly projecting cylindrical wall 164 which surrounds and generally is aligned with tines 144 of the grab ring 140. The lower end of cylindrical wall 164 includes a tapered outer edge 166 which aligns with and engages the tines 144 to deflect them outwardly when the release ring is pushed downwardly in the direction indicated by arrow A in FIG. 6. Edge 166 forms a cam surface to provide the necessary deflection. The release ring 160 is captively held within the assembly by the interface of annular shoulder 159 of containment ring 150 and the outwardly extending annular surface 168 of the conically tapered member 166, as best seen in FIG. 6. To facilitate insertion of release ring 160 into the modular cartridge 100 and specifically the containment ring 150, a pair of slots 167 spaced at 180° may be provided in cylindrical wall 164 to allow some flexing of the edges 166.

Figure 8:
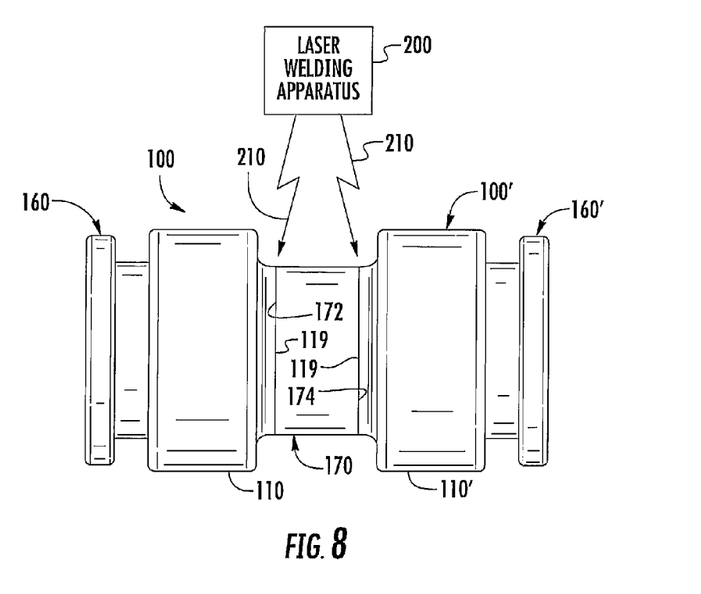
FIG. 8 is a side elevational view of a coupling with modular cartridges welded thereto at opposite ends by a laser welding apparatus.

FIG. 8 illustrates the application of two modular cartridges 100 and 100' of identical construction to a coupling 170, which can be a relatively short thin walled cylindrical member having circular annular edges 172 and 174, that abut and align with the same diameter edges 119 of cup 110 and form a butt joint by a welding apparatus 200. Welding apparatus 200 is preferably a laser welding apparatus in which the laser beams 210 are directed to the butt joints between edges 172 and 174 and edges 119 of the cups 110 as the cup and fitting are rotated under the beam. The welding apparatus can be any number of commercially available laser welding apparatuses, such as made by Trumpf North America, P Thomas, IPG Photonics, or other commercially available apparatus that will fuse the metal at the butt joints of the assembly as it is rotated approximately 4 to 7 RPM. A suitable holding and rotating jig is used for successively holding members 100 and 170, and subsequently 100' and 170, during the welding process in which a narrowly focused laser beam of about 1 mm is applied to the butt joint. The rotation speed and narrowly focused laser beam allows the welding of members 170 and 100, 100' without damaging the surrounded polymeric materials forming the seal 120, the backing ring 130, the containment ring 150, or the release ring 160.

The coupling 170 of FIG. 8 is shown in FIG. 9 with a pair of modular cartridges 100 and 100' welded thereto for receiving fluid conduits 190 and 195 for providing a fluid communication between conduits 190 and 195. Conduits, such as conduits 190 and 195 and other such conduits, can also be fit into other plumbing fittings, such as shown in FIGS. 10-13, or valves including the modular cartridges of the present invention.

Use of the modular cartridges 100 saves the weight of material used. Cup 110 can be made of a thinner walled material. An example of the thickness of the copper making up the cup 110 and a mating fitting, such as coupling 170, can be 0.029 inches instead of the usual thickness of 0.040 to 0.060 inches for a ½ inch to ¾ inch fitting. As an example, the savings in metal, such as copper for larger sized fittings from ¾ inch to 2 inches, is up to 50% of the weight of material typically employed. This unexpected result is due to the design of the modular cartridge which allows laser welding of the push-to-connect cartridge to thinner walled plumbing fittings.

Figure 10:
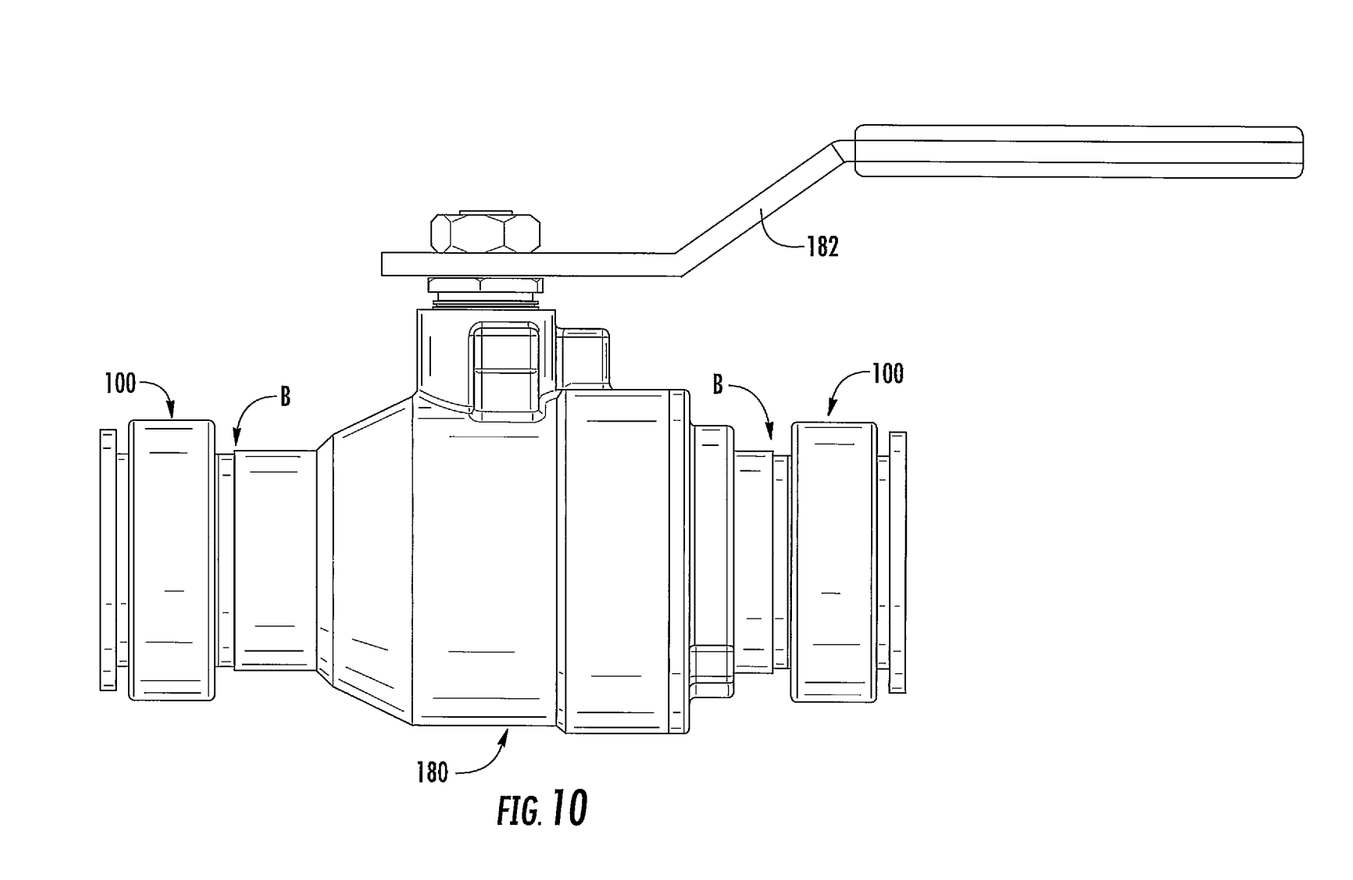
FIG. 10 is a side elevational view of a ball valve incorporating a pair of the modular cartridges of the present invention.

In FIG. 10, there is shown a ball valve 180 of generally conventional construction including a typical internal ball flow control element controlled by a handle 182 to control the flow of fluids through the valve. Welded to the input and output ends of the valve 180 are modular cartridges 100 of the same construction as that shown in FIGS. 6 and 7. The cartridges are laser welded as in the above process at junctions indicated by arrows B in FIG. 10.

Figure 11:
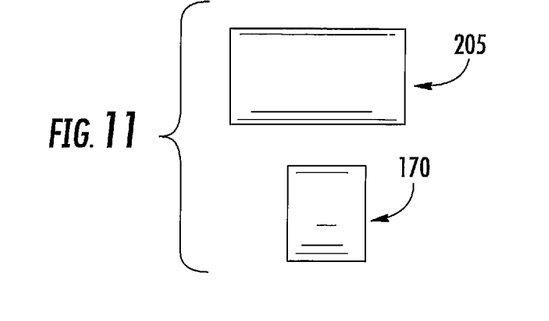
FIG. 11 is a comparison of a standard in-line coupling (at the top) as compared to a coupling (at the bottom) which can be used with a modular cartridge of the present invention.

In FIG. 11, a conventional coupling 205 is shown at the top and is twice the length of a coupling 170 using modular cartridges 100, such as shown in FIGS. 8 and 9. Similarly, the wall thickness of coupling 205 is typically 15% to 20% thicker than the thickness necessary with the coupling 170.

Figure 12:
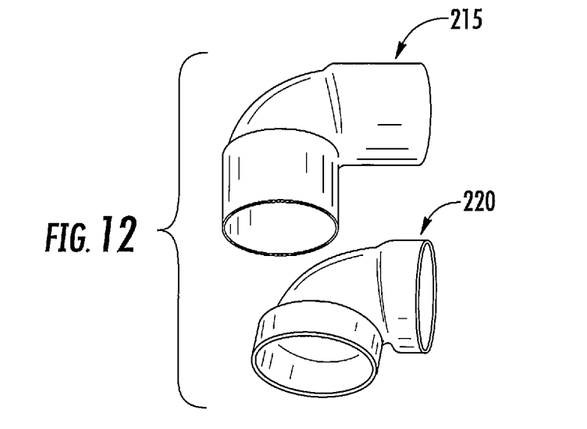
FIG. 12 shows a pair of elbows with the upper elbow showing the typical solder-type connection and the lower elbow being adapted to receive a modular cartridge of the present invention.

FIG. 12 shows a pair of elbows with a prior art, typically soldered, elbow 215 at the top. Elbow 215 is both thicker and larger in size, i.e., length of the two legs, than an elbow 220, which can be welded to the modular cartridges 100 of the present invention.

Figure 13:
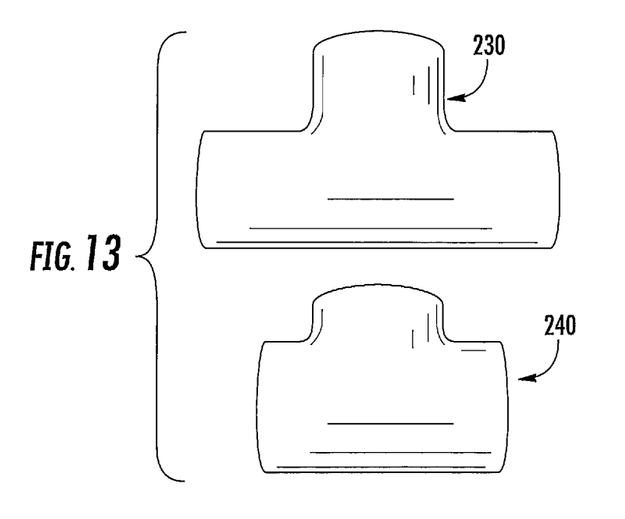
FIG. 13 is a similar comparison of a T-coupling at the top of conventional construction and the reduced material T-coupling which can be used with the modular cartridge of the present invention.

Similarly, in FIG. 13, a standard T-fitting 230 is shown at the top which is thicker and has legs which are substantially larger that the legs of fitting 240, which can be used with the modular cartridges 100 of the present invention.

Thus, with the use of the modular cartridges embodying the present invention, standard solder-type plumbing fittings can be inexpensively replaced with fittings using less material and be converted during manufacturing to push-to-connect fittings, allowing easy installation at a job site.

It will become apparent to those skilled in the art that various modifications to the preferred embodiments of the invention as described herein can be made without departing from the spirit or scope of the invention as defined by the appended claims.

The invention claimed is:

1. A push-to-connect modular assembly for a push-to-connect end to be coupled to a second plumbing fitting comprising:
   a cylindrical cup having a cylindrical side wall with an inner surface, an annular seal-receiving surface at one end and an annular axially inwardly projecting shoulder at an opposite end;
   a circular seal having a flat annular surface positioned against said annular seal-receiving surface of said cup, said circular seal further including a first annular rim opposite said flat annular surface and an outer annular rim engaging said inner surface of said cylindrical side wall of said cup;
   a circular backing ring including a recess for receiving said first annular rim of said seal and positioned against said seal on a side opposite said annular surface;
   a grab ring including inwardly projecting tines seated against said backing ring on a side opposite said seal;
   a containment ring contacting said grab ring on a side opposite said backing ring, said containment ring engaging said seal and said backing ring and further engaged by said annular shoulder of said cup to hold said containment ring, grab ring, backing ring and seal together; and
   wherein said cup includes a cylindrical section at an end opposite said annular shoulder, which cylindrical section extends outwardly from said annular seal-receiving surface and includes an edge welded to an edge of a cylindrical second plumbing fitting.

2. The assembly as defined in claim 1 wherein said cup is made of metal such that said edge of said cylindrical section can be laser welded to a second plumbing fitting made of a compatible material.

3. The assembly as defined in claim 1 and further including a release ring captively held by said containment ring and including a cam surface that selectively engages said tines of said grab ring when said release ring is moved into contact with said tines for releasing a conduit positioned in said assembly.

4. The assembly as defined in claim 3 wherein said backing ring and said containment ring are made of a polymeric material.

5. The assembly as defined in claim 4 wherein said seal is a substantially washer-shaped member made of a polymeric material.

6. A push-to-connect assembly for coupling plumbing components together, said assembly comprising:
   a metal cup having an end with an exposed edge for welding to one end of one of a coupling, elbow, T, or valve, said cup having a cylindrical side wall with an inner surface, an annular seal-receiving surface at one end and an annular radially inwardly extending shoulder at an opposite end;
   a cartridge positioned in said cup, said cartridge having a push-to-connect grab ring for receiving and holding a fluid conduit and a seal for sealing a fluid conduit positioned in said cartridge, wherein said seal has a flat annular surface positioned against said annular seal-receiving surface of said cup and an outer annular rim engaging said inner surface of said cylindrical side wall of said cup, wherein said annular shoulder of said cup engages and compressively holds said cartridge in said assembly; and
   wherein said exposed edge of said metal cup is welded to one of a coupling, elbow, T, or valve.

7. The assembly as defined in claim 6 wherein said seal is generally washer-shaped.

8. The assembly as defined in claim 6 wherein said exposed edge of said metal cup is secured to one of a coupling, elbow, T, or valve by laser welding.

9. The assembly as defined in claim 6 wherein said cartridge further includes a release ring with a cam surface for engaging tines on said grab ring to deflect said tines away from a conduit inserted into said cartridge to release said conduit for removal from said cartridge.

10. A plumbing fitting with a push-to connect end comprising:
    one of a coupling, elbow, T, or valve;
    a metal cup having an edge welded to a mating edge of a metal coupling, elbow, T, or valve, said cup having a cylindrical side wall with an inner surface, an annular seal-receiving surface at one end and an annular radially inwardly extending shoulder at an opposite end;
    a cartridge positioned in said cup, said cartridge having a push-to-connect grab ring for receiving and holding a fluid conduit, a backing ring, and a seal for sealing a fluid conduit positioned in said cartridge; and
    wherein said seal has a flat annular surface positioned against said annular seal-receiving surface of said cup, said seal further including a first annular rim opposite said flat annular surface engaging said backing ring and an outer annular rim engaging said inner surface of said cylindrical side wall of said cup, wherein said annular shoulder of said cup engages and holds said cartridge in said plumbing fitting.

11. The plumbing fitting as defined in claim 10 wherein said cartridge is laser welded to said one of a coupling, elbow, T, or valve.

12. The plumbing fitting as defined in claim 11 and further including a grab ring with spaced-apart tines for gripping and holding a conduit positioned within said cartridge and wherein said cartridge further includes a release ring with a cam surface for engaging said tines on said grab ring to deflect said tines away from a conduit inserted into said cartridge to release said conduit for removal from said cartridge.

* * * * *